Sept. 25, 1956 J. H. WALKER ET AL 2,764,041
AUXILIARY TRANSMISSION FOR TRACTORS
Filed Feb. 5, 1953 3 Sheets-Sheet 1

John H. Walker
Clarence W. Crenshaw
INVENTOR.

BY

ATTORNEY

Sept. 25, 1956  J. H. WALKER ET AL  2,764,041
AUXILIARY TRANSMISSION FOR TRACTORS
Filed Feb. 5, 1953  3 Sheets-Sheet 2

John H. Walker
Clarence W. Crenshaw
INVENTOR.

BY

ATTORNEY.

Sept. 25, 1956    J. H. WALKER ET AL    2,764,041
AUXILIARY TRANSMISSION FOR TRACTORS
Filed Feb. 5, 1953    3 Sheets-Sheet 3
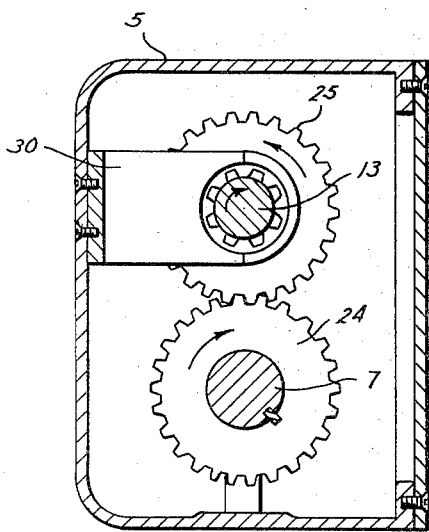
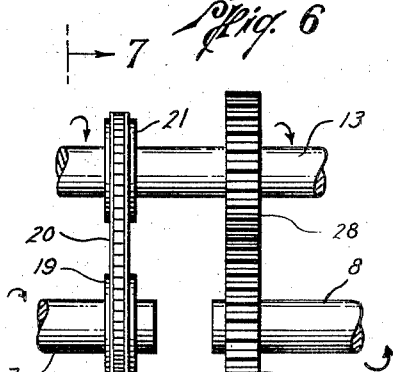
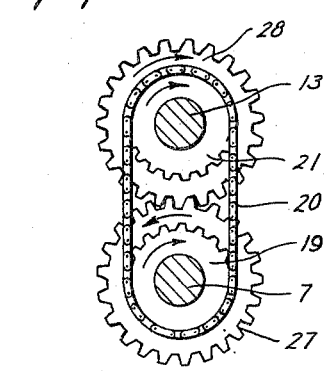
John H. Walker
Clarence W. Crenshaw
INVENTOR.
BY
ATTORNEY United States Patent Office 2,764,041
Patented Sept. 25, 1956

2,764,041
AUXILIARY TRANSMISSION FOR TRACTORS

John H. Walker and Clarence W. Crenshaw,
Beaumont, Tex.

Application February 5, 1953, Serial No. 335,312

1 Claim. (Cl. 74—745)

The invention concerns a method and an apparatus for reversing the direction of movement of tractors. More specifically, it contemplates a method of reversing the direction of movement of tractors in which the action of the conventional power transmission, with which the tractor is ordinarily equipped, is modified by the action of an auxiliary transmission whereby the tractor may be caused to move in a direction opposite to the direction in which it would normally be moved upon application of power thru the conventional transmission. The invention further contemplates an auxiliary transmission which, in conjunction with the conventional transmission, is adapted to reverse the direction of movement of the tractor.

Tractors are ordinarily provided with power transmissions which permit the tractor to be moved, selectively, at any one of several forward speeds as well as in reverse. Some tractors have auxiliary transmissions which may be installed as optional equipment and are interchangeable with a section of drive shaft interposed between the clutch and the conventional transmission, whereby the speed of the tractor may be stepped up or stepped down as desired.

It is an object of the invention to provide an arrangement which will permit tractors to be moved in a reverse direction at as many speeds as they were formerly moved in a forward direction.

It is a further object of the invention to provide an auxiliary transmission which may be installed as optional equipment on existing tractors, and which, in conjunction with the conventional transmission, is adapted to reverse the direction of movement of the tractor.

Another object of the invention is to provide an auxiliary transmission of the type described which may be shifted from one operative position to another whereby the direction of movement of the tractor may be reversed at will.

In a number of operations which are now performed by tractors, such as earth moving, leveling, ditching and terracing, it would sometimes be advantageous to turn the driver's seat around and to operate the tractor in reverse direction. This would eliminate the need for the operator to look over his shoulder to observe the operation of the tools, which are ordinarily mounted on the rear of the tractor. The larger wheels, as well as the lifting mechanism supporting the tools, are located at the rear of the tractor. In bulldozing operations, where the blade is mounted on the front end, the usual practice is to support the blade from the rear end of the tractor. Thus it would sometimes be advantageous to arrange the tools for movement of the tractor in reverse direction. Because of the large rear wheels, the tractor is better adapted to travel over rough ground when moving in a reverse direction. It is therefore desirable to provide means for reversing the direction of movement of the tractor as desired and to permit the tractor to be moved, selectively, at any one of several speeds in a reverse direction.

The invention will be readily understood by referring to the following description and the accompanying drawing, in which:

In Figs. 2 and 3 the auxiliary transmission is shown in one of two operative positions as hereinafter more fully described.

Fig. 5 is a sectional view in elevation, taken on the line 5—5 of Fig. 3.

Fig. 6 is a view in elevation, similar to Fig. 3, showing a modified form of the invention in which the auxiliary transmission has only one operative position and cannot be shifted from one operative position to another.

Fig. 7 is a sectional view in elevation, taken on the line 7—7 of Fig. 6.

Figure 1:
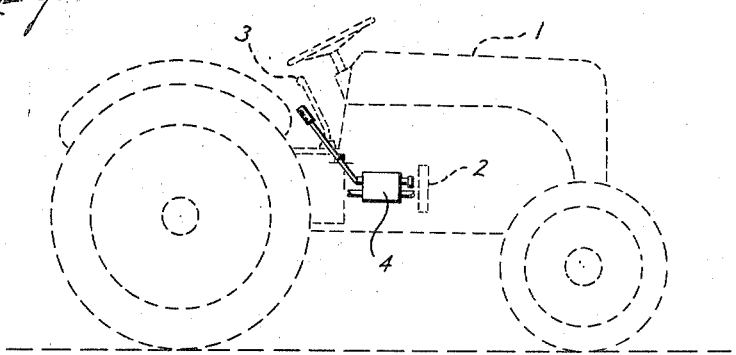
Fig. 1 is a diagrammatic view in elevation showing the relative position of the auxiliary transmission of the invention with respect to a tractor, the tractor being shown in dotted lines.

Referring to Figs. 1–5 of the drawing, the numeral 1 designates the tractor. The tractor 1 has a clutch 2, which is operatively connected as hereinafter described to a conventional transmission, indicated by the gearshift lever 3. An auxiliary transmission, indicated generally by the numeral 4, is interposed between, and operatively connects, the clutch 2 and the conventional transmission.

The auxiliary transmission 4 is enclosed within a housing 5 having a cover plate 6, and preferably is immersed in an oil bath. Shafts 7 and 8, which are aligned end to end, are rotatably mounted within the housing 5 and extend outwardly from opposite ends thereof. Bearings 9 and 10 support the adjacent ends of the shafts 7 and 8, and bearings 11 and 12 support the shafts 7 and 8 where they pass thru the end walls of the housing 5. The shaft 7 is operatively connected to the clutch 2, and in turn imparts motion to the shaft 8 as hereinafter described. The shaft 8 is operatively connected to the conventional transmission.

Figure 2:
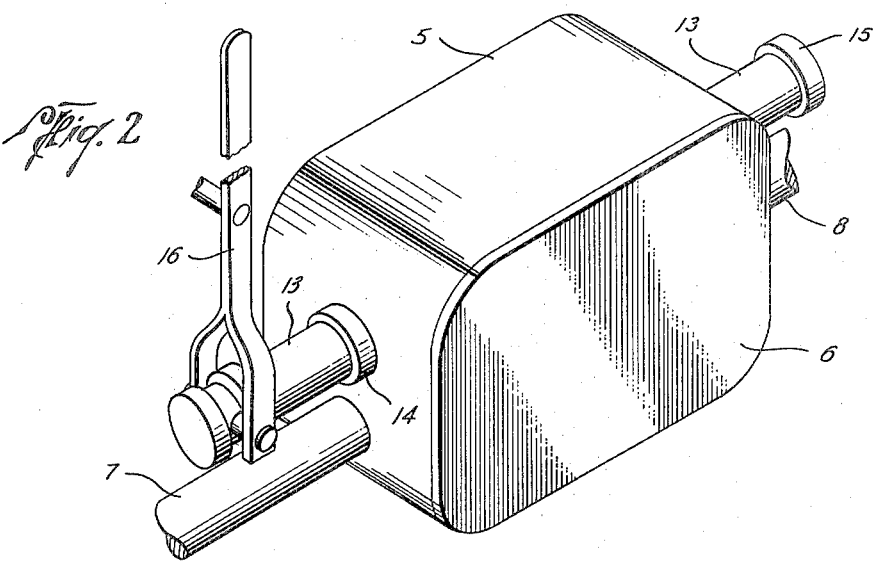
Fig. 2 is a perspective view, on an enlarged scale, of an auxiliary transmission embodying the invention.
Figure 3:
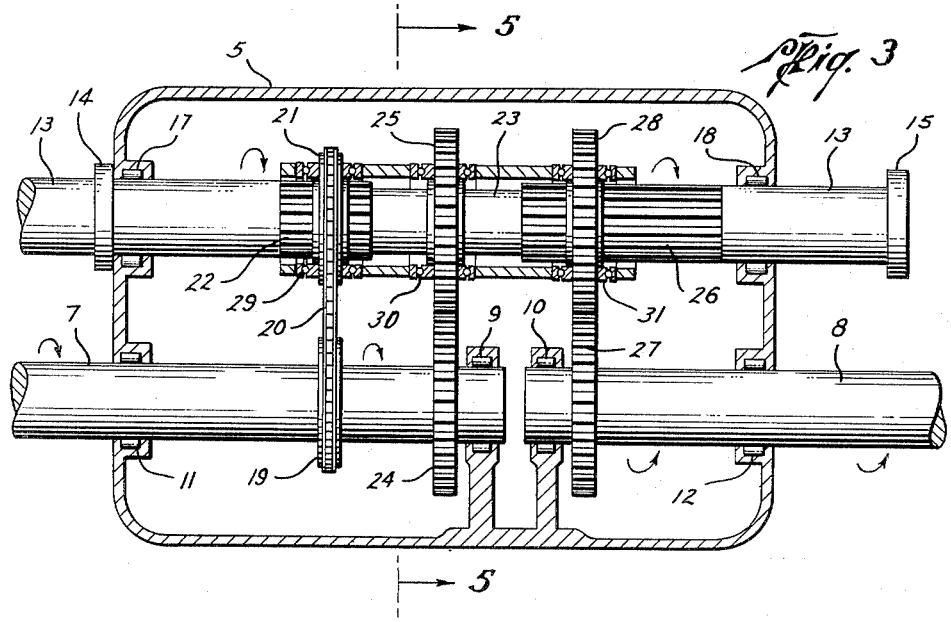
Fig. 3 is a sectional view in elevation of the auxiliary transmission shown in Fig. 2.
Figure 4:
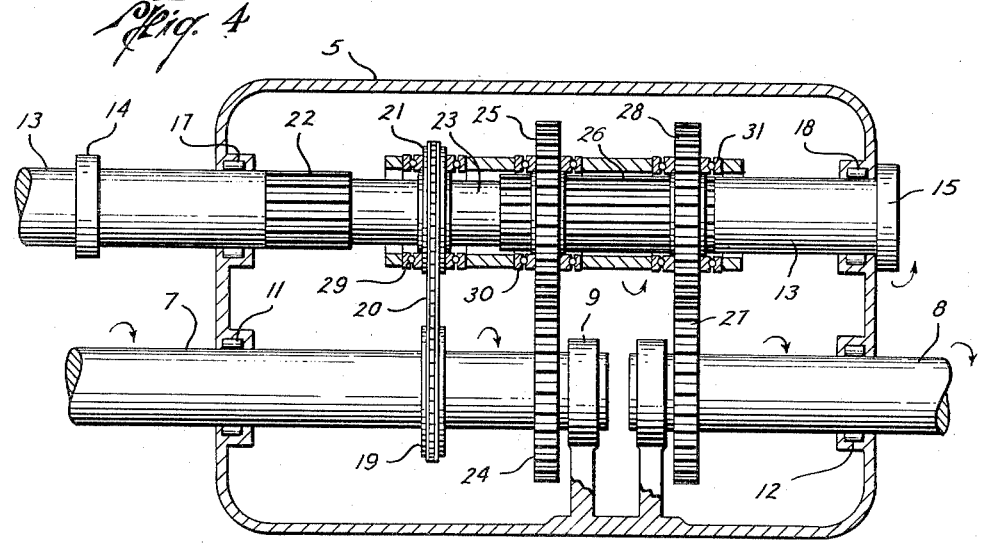
Fig. 4 is a sectional view in elevation, similar to Fig. 2, showing the auxiliary transmission in its second position.

A shaft 13 is disposed parallel to the shafts 7 and 8 and is rotatably and slidably mounted within the housing 5. The shaft 13 is capable of a limited longitudinal movement, as shown in Figs. 3 and 4, and is provided with abutments 14 and 15 which engage the outer surface of the housing 5 to limit the longitudinal movement thereof. A lever 16 is connected to one end of the shaft 13 whereby the shaft 13 may be shifted to the right as shown in Figs. 2 and 3, or to the left as shown in Fig. 4. Bearings 17 and 18 support the shaft 13 where it passes thru the ends of the housing 5.

A sprocket 19, which is rigidly secured to the shaft 7, is connected by a chain 20 to a sprocket 21. The sprocket 21 has a grooved bore which, as shown in Fig. 3, engages a splined section 22 of the shaft 13 when the shaft 13 is moved to its right-hand position. In this position the shaft 7 is capable of imparting motion, thru the sprockets 19 and 21 and the chain 20, to the shaft 13, the shaft 13 being turned in the same direction as the shaft 7. When the shaft 13 is moved to the left, as shown in Fig. 4, the bore of the sprocket 21 engages a smooth section 23 of the shaft 13. In this position the sprocket 21 does not act upon the shaft 13.

A gear 24, which is rigidly secured to the shaft 7, engages a gear 25. The gear 25, like the sprocket 21, has a grooved bore which, as shown in Fig. 4, engages a splined section 26 of the shaft 13 when the shaft 13 is moved to its left-hand position. In this position the shaft 7 is capable of imparting motion, thru the gears 24 and 25, to the shaft 13, the shaft 13 being turned in the opposite direction from the shaft 7. When the shaft 13 is moved to the right, as shown in Fig. 3, the bore of the gear 25 engages the smooth section 23 of the shaft 13. In this position the gear 25 does not act upon the shaft 13.

A gear 27, which is rigidly secured to the shaft 8, engages a gear 28. The gear 28, like the gear 25 and the sprocket 21, has a grooved bore which, as shown in Figs. 3 and 4, at all times engages the splined section 26 of the shaft 13. Thus the shaft 13 is capable of imparting motion, thru the gears 28 and 27, to the shaft 8, the shaft 8 being turned in the opposite direction from the shaft 13. As shown in Fig. 3 the shaft 8 is turned in the opposite direction from the shaft 7, while in Fig. 4 the shafts 7 and 8 are turned in the same direction.

Guides 29, 30 and 31 are provided for maintaining the sprocket 21 and the gears 25 and 28 in alignment with the sprocket 19 and the gears 24 and 27, respectively, while permitting the shaft 13 to be moved longitudinally.

Referring to Figs. 6 and 7 of the drawing, the arrangement is the same as in Figs. 3, 4 and 5 except that the shaft 13 is not movable longitudinally and the gears 24 and 25 have been omitted. The sprocket 21 is rigidly secured to the shaft 13, and the arrangement is such that the shaft 8 at all times turns in the opposite direction from the shaft 7.

The invention may be modified in various ways without departing from the spirit and scope thereof.

We claim:

In tractors having a transmission means permitting the tractor to be moved, selectively, at any one of several forward speeds as well as in reverse, means for reversing the direction of movement of the tractor which comprises a second transmission means operatively connected in series with the first transmission means, the second transmission means including a rotatable shaft, a second shaft aligned end to end with the first shaft, a third shaft disposed in parallel relation to the first two shafts, a pair of sprockets mounted, respectively, on the first and third shafts and connected by a chain, a pair of gears mounted, respectively, on the first and third shafts and meshing with each other, a pair of gears mounted, respectively, on the second and third shafts and meshing with each other, one of the sprockets and one of the gears of each of the two pairs of gears having grooved bores adapted to engage splined sections of the third shaft, the third shaft being movable longitudinally whereby the splined sections selectively engage one of the sprockets or one of the gears of the first pair of gears and the third shaft is thereby turned either in the same direction as the first shaft or in the opposite direction, one of the gears of the second pair of gears at all times engaging a splined section of the third shaft whereby the second shaft is turned in the opposite direction from the third shaft.

References Cited in the file of this patent

UNITED STATES PATENTS

| 796,748 | Marshall | Aug. 8, 1905 |
| 2,185,537 | Brownlee | Jan. 2, 1940 |
| 2,299,563 | Carlson | Oct. 20, 1942 |
| 2,502,356 | Wagner | Mar. 28, 1950 |

FOREIGN PATENTS

| 443,823 | Italy | Jan. 7, 1949 |